(12) United States Patent
Lelkes et al.

(10) Patent No.: US 6,534,946 B2
(45) Date of Patent: Mar. 18, 2003

(54) SYNCHRONOUS AC MOTOR

(75) Inventors: András Lelkes, Künzelsau (DE); Jens Krotsch, Niederstetten (DE)

(73) Assignee: ebm Werke GmbH & Co. KB, Mulfingen (DE)

( * ) Notice: Subject to any disclaimer, the term of this patent is extended or adjusted under 35 U.S.C. 154(b) by 0 days.

(21) Appl. No.: 09/779,316

(22) Filed: Feb. 8, 2001

(65) Prior Publication Data

US 2001/0011877 A1 Aug. 9, 2001

(30) Foreign Application Priority Data

Feb. 9, 2000 (DE) ................................. 200 02 284 U

(51) Int. Cl.[7] .............................................. G05B 19/40
(52) U.S. Cl. ...................... 318/685; 318/254; 318/439; 318/138; 310/67 R
(58) Field of Search ............................... 318/138, 254, 318/439, 685, 696, 608, 721; 310/67 R

(56) References Cited

U.S. PATENT DOCUMENTS

| | | | | |
|---|---|---|---|---|
| 4,563,620 A | * | 1/1986 | Komatsu | ................... 318/138 |
| 4,837,493 A | * | 6/1989 | Maeno et al. | ................ 318/685 |
| 4,924,125 A | * | 5/1990 | Clark | ........................ 310/67 R |
| 5,008,573 A | | 4/1991 | Beppu et al. | |
| 5,905,322 A | | 5/1999 | Tsay | |

FOREIGN PATENT DOCUMENTS

| | | |
|---|---|---|
| DE | 197 57 136 | 6/1999 |
| FR | 2 699 018 | 6/1994 |
| JP | 58 051784 | 3/1983 |

* cited by examiner

*Primary Examiner*—Khanh Dang
(74) *Attorney, Agent, or Firm*—Kilpatrick Stockton LLP

(57) ABSTRACT

The invention relates to a mains-commutated, synchronous AC motor (1) with permanent-magnet excitation, which is configured as an external-rotor motor with a permanent-magnet external rotor (6) which rotates around an inner stator. In this case, an electronic starting apparatus (2) is provided which actuates the stator (4) in order to start the external rotor (6) in such a manner that the external rotor (6) is accelerated in a controlled manner to its synchronous rotation speed, and then continues to run in the mains-commutated synchronous mode.

15 Claims, 5 Drawing Sheets

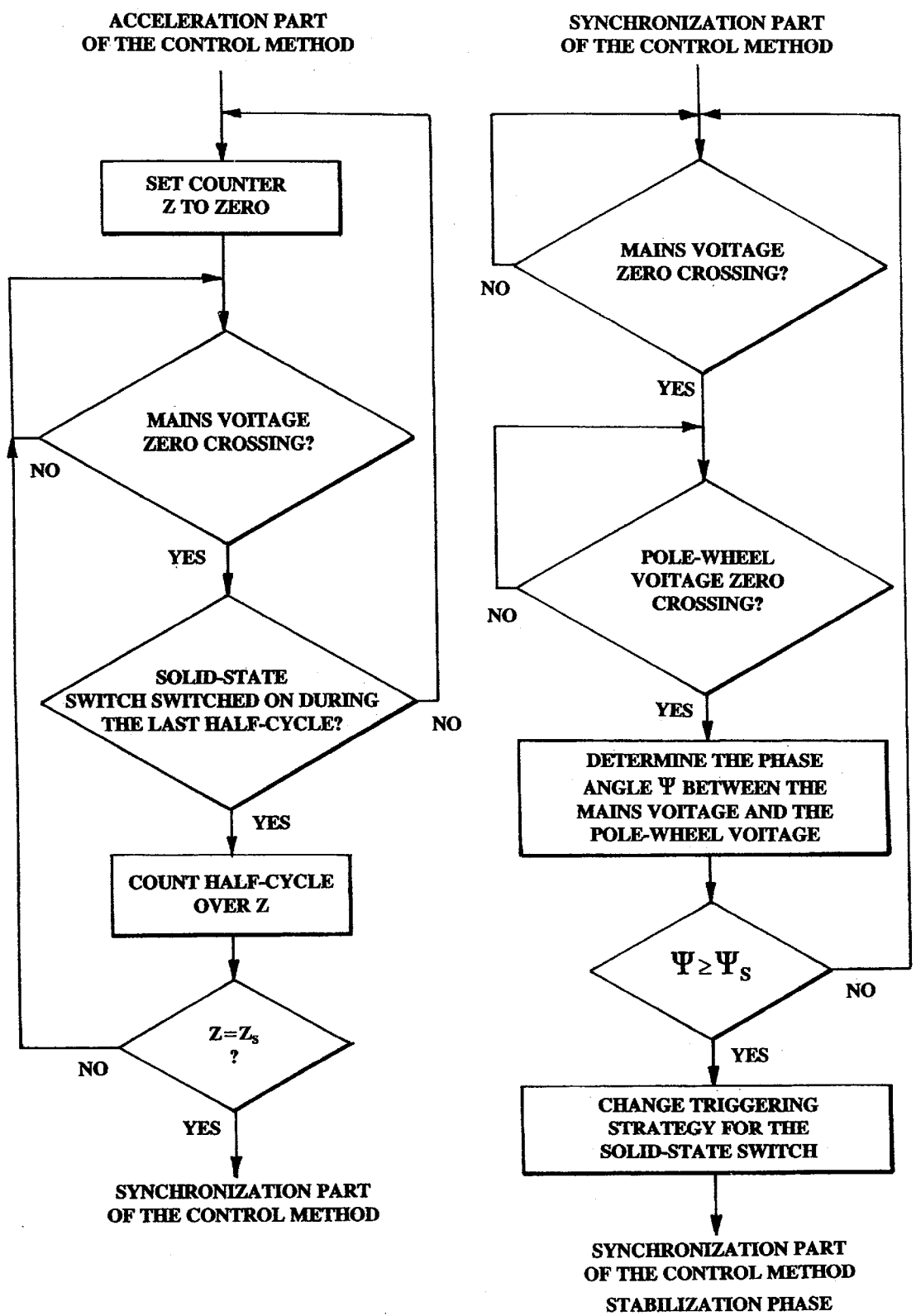

Figure 1:
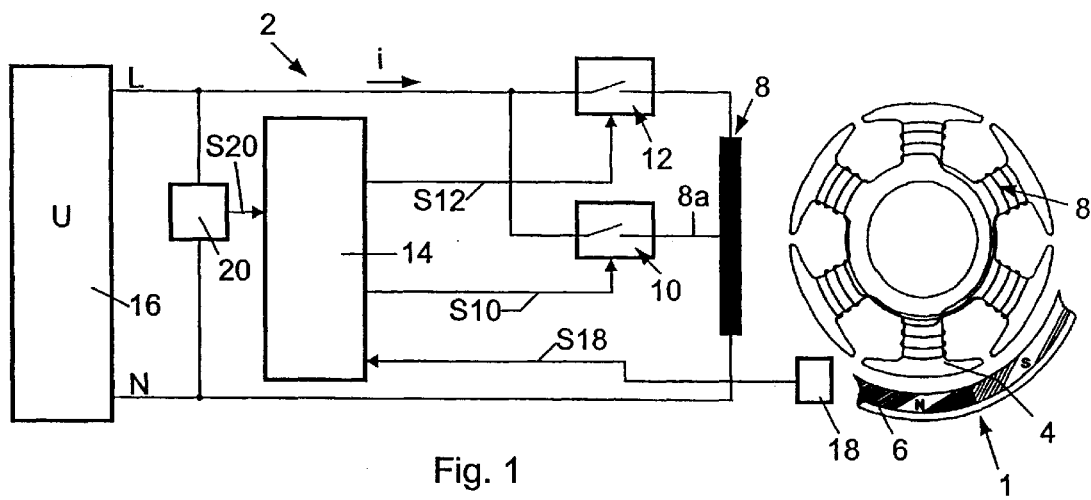

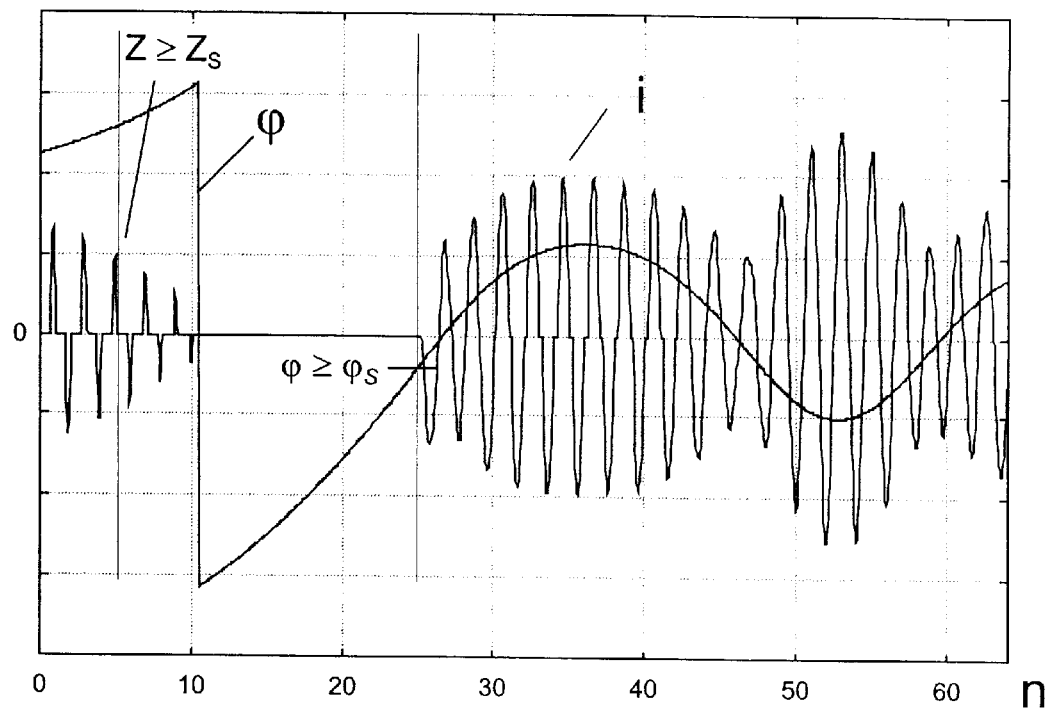
FIG. 8
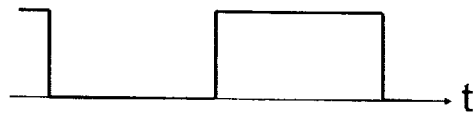
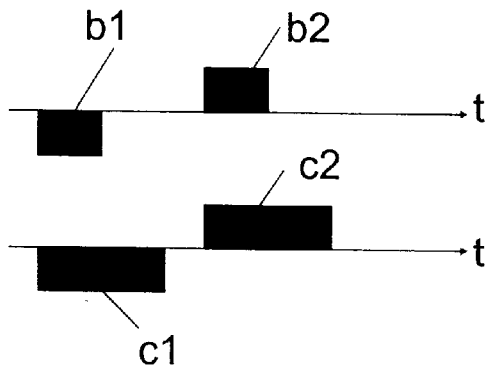
Fig. 9

SYNCHRONOUS AC MOTOR

The present invention relates to a synchronous AC motor which uses permanent-magnet excitation and is solely mains-commutated in the synchronous mode after starting.

Mains-commutated synchronous motors such as this operate in the synchronous mode at a synchronous rotation speed which is governed uniquely by the mains frequency and the number of pole pairs. Starting from rest and further acceleration to synchronism are in many cases ensured by special measures.

For example, EP 0 574 823 B1 describes an electronic starting apparatus for such a synchronous motor with a permanent-magnet rotor. Similar devices are also described in the other publications EP 0 654 890, EP 0 666 639, EP 0 682 404, DE 195 33 076, DE 195 33 344, DE 197 01 856 and EP 0 872 949. However, all these publications obviously relate only to motors of the internal-rotor type.

In comparison to synchronous motors, electronically commutated (DC) motors (so-called EC motors) are constructed very similarly, but an EC motor is supplied via special electronics with an electronically produced voltage whose frequency and phase angle are always determined as a function of the rotation speed and rotor position such that the motor develops an adequate torque at any given rotation speed. There are therefore far fewer problems associated with the starting of EC motors than synchronous motors. EC motors can therefore also use designs based on the external-rotor principle even if the external rotor in this case has a high moment of inertia counteracting the acceleration torque during starting owing to the rather high mass revolving on a relatively large radius. However, particularly in applications where the motor is intended to be operated directly from the AC mains, the commutation electronics for an EC motor are in fact particularly complex, owing to the high intermediate-circuit voltage. The switching elements (MOSFETs or IGBTs) need to have a high withstand voltage, and the complex actuation circuit increases the costs further. The intermediate-circuit capacitors which are required not only occupy a large volume, but also limit the life of the electronics. The electronics do not draw sinusoidal currents from the mains, and power-factor correction measures are therefore also often necessary. Overall, the electronics are not only costly, but are also difficult to integrate in the motor.

The external-rotor principle offers particular advantages for certain applications, in particular for fans, since an external-rotor motor is particularly compact owing to the short end windings and the fact that it is mounted in a manner which allows it to be integrated in the interior of the stator, so that a highly space-saving motor/fan unit can be formed by direct installation in a fan impeller. The fixed connection of all the rotating elements ensures accurate balancing, and thus little load on the bearing. Long life is furthermore achieved by virtue of the low bearing temperature, since the motor is located in the cooling flow of the air being conveyed. A further advantage of this type is the simpler and lower-cost winding technology for the stator.

Although this type of motor offers a large number of advantages for both radial and axial fans, no fans using a mains-commutated external-rotor synchronous motor are yet known from the prior art.

However, other specific configurations of external-rotor synchronous motors are known from the prior art.

For example, EP 0 050 456 describes a synchronous motor having an internal or external rotor, but this has an electromechanical commutator, that is to say a commutator with brushes.

DE-UM 71 03 331 describes an external-rotor reluctance motor.

EP 0 189 652 describes an external-rotor AC motor whose rotor comprises three layers, to be precise a permanent-magnet layer with a high coercivity force and low electrical conductivity, a soft-magnetic layer with high permeability, and a ferromagnetic layer with high permeability, high electrical conductivity and a specific electrical resistance. This motor is therefore actually a combination of an asynchronous squirrel-cage motor, a hysteresis motor and a synchronous motor with permanent-magnet excitation.

DE-A 14 88 370 describes an external-rotor synchronous motor with permanent-magnet excitation. However, it is evident from the description that this motor contains a squirrel cage in the rotor, so that this is a combination of an asynchronous motor and a synchronous motor with permanent-magnet excitation.

EP 0 431 178 describes a synchronous machine with an external rotor as a generator. According to the description, generators and motors admittedly have essentially the same mechanism, so that generators can in principle also be used as motors. However, this is not entirely correct, since there is no need for a generator to start on its own. This publication therefore also contains no specific references to use as a synchronous motor and the starting problems that occur in that case.

DE 33 20 805 describes a multi-pole multi-phase synchronous machine in the form of a ring motor. DE-C 926 434 describes a synchronous motor with material having high hysteresis in the secondary section, and in the form of an internal- or external-rotor motor. This is therefore specifically a hysteresis motor.

Finally, DE 2 234 987 describes a single-phase hysteresis synchronous motor with a specifically treated magnetic material.

The present invention is based on the object of providing a synchronous AC motor which combines the advantages of a pure synchronous motor with permanent-magnet excitation and mains commutation and those of an EC motor of the external-rotor type.

According to the invention, this is achieved, on the basis of a mains-commutated, synchronous AC motor with permanent-magnet excitation, by this motor being configured as an external-rotor motor with a permanent-magnet external rotor which rotates around an inner stator.

This configuration according to the invention of a mains-commutated synchronous motor with permanent-magnet excitation as an external-rotor motor was in no way obvious to a person skilled in the art. The extensive prior art referred to above makes it clear that the specialist world had in fact been prejudiced, assuming without exception that such a synchronous motor with an external rotor would not start in a way such that it would reach synchronism owing to its high moment of inertia (long mechanical time constant). Furthermore, it had been assumed that, owing to the higher moment of inertia, a considerably greater amount of energy would be necessary for starting and that a correspondingly higher motor current for a greater flux would be necessary for this purpose which, however, would also mean a greater risk of demagnetization of the rotor magnet. It therefore appeared to be improbable that acceleration could be achieved without demagnetization of the rotor magnet. Accordingly, it is surprising to find that the external-rotor synchronous motor according to the invention can be started just by using simple starting methods which are known per se, that is to say that starting and acceleration are possible without demagnetization, despite the increased moment of inertia of the external rotor. A special, novel starting apparatus with particular starting actuation of the motor is preferably used in order to reach synchronous operation reliably. In this case, according to the invention, the starting of the external rotor is subdivided into a number of phases, in each of which the stator winding is actuated in a different manner, matched in an optimum manner to the respective rotation speed. These special measures will be described in even more detail further below.

Further advantageous refinement features of the invention are contained in the dependent claims.

Figure 2:
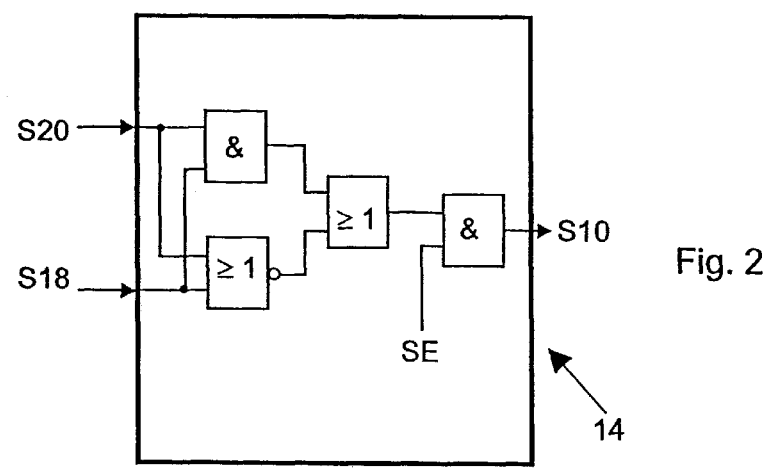
Figure 3:
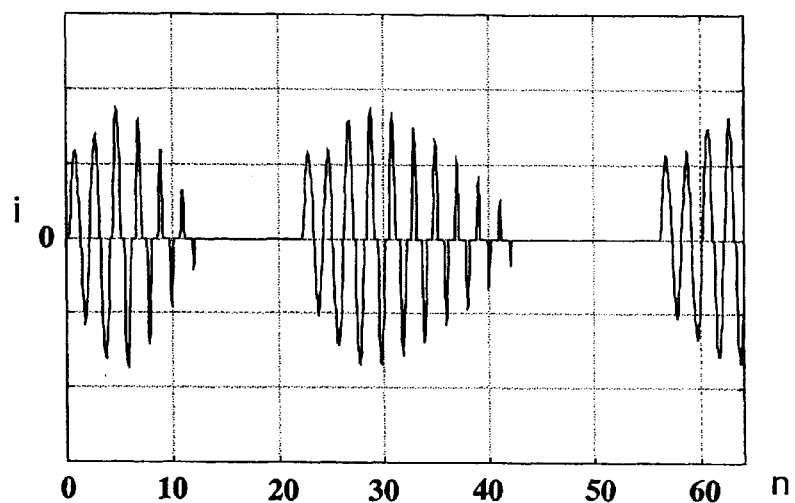
Figure 4:
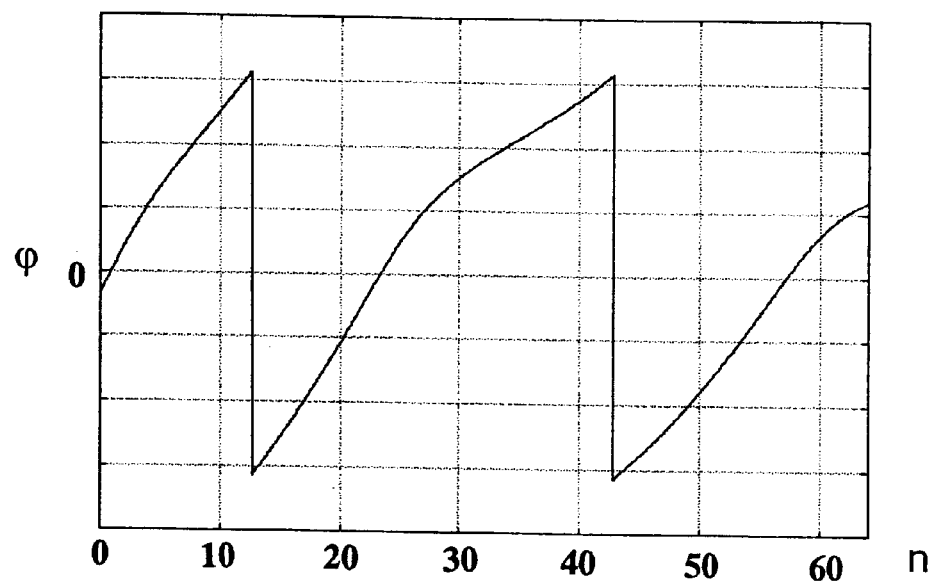
Figure 5:
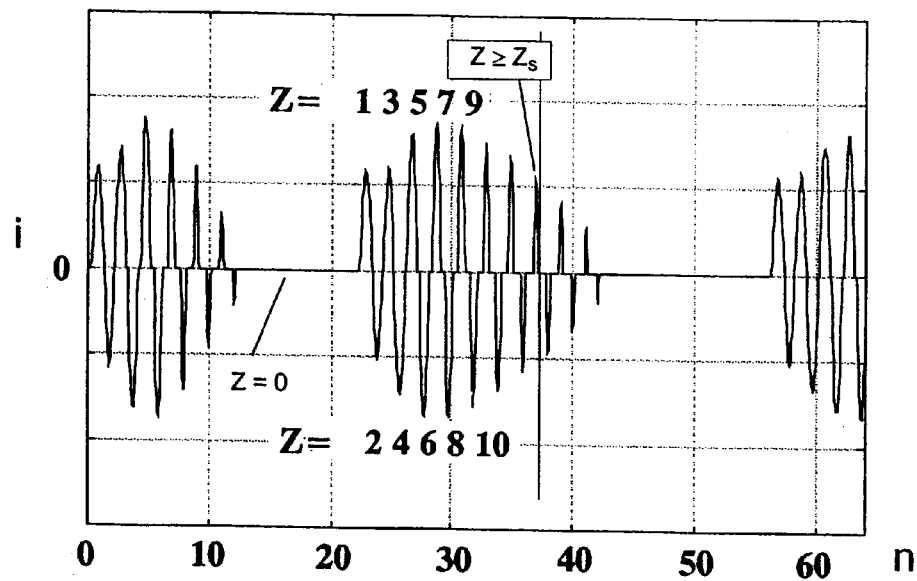
Figure 10:
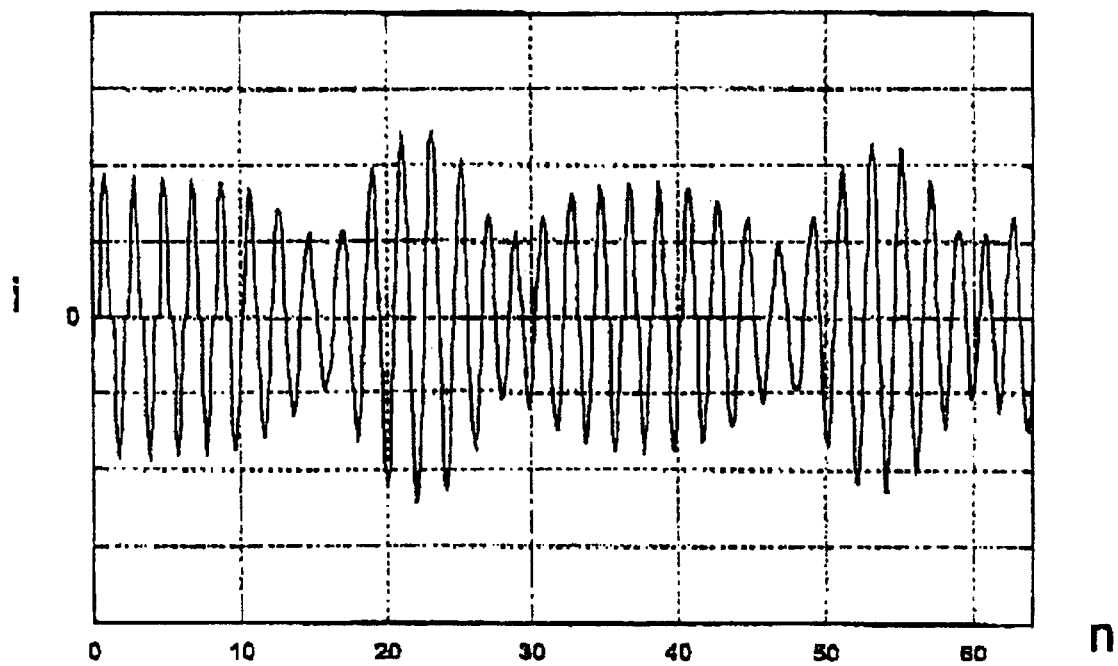
Figure 11:
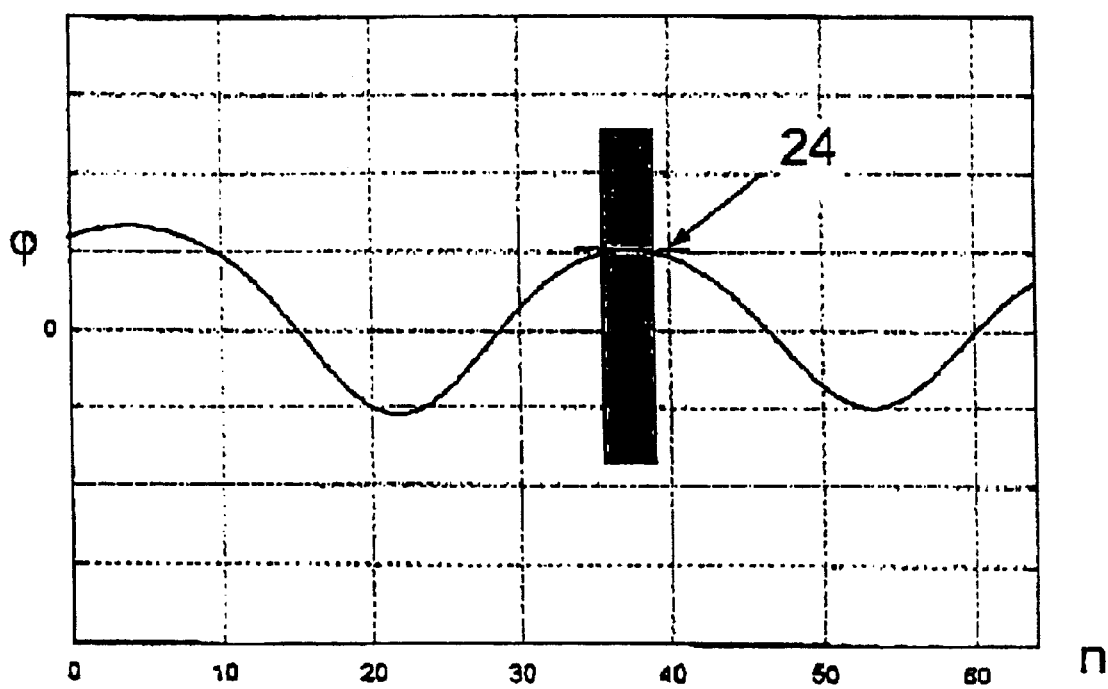

The invention will be explained in more detail by way of example with reference to the drawing, in which:

FIG. 1 shows a schematic illustration of an external-rotor synchronous motor according to the invention with a block diagram of an electronic starting apparatus, FIG. 2 shows a basic illustration of a control unit associated with the starting apparatus, in order to explain the actuation during the starting phase, FIG. 3 shows a diagram to illustrate the profile of the winding current as a function of the mains voltage half-cycles at a rotation speed close to the synchronous rotation speed, FIG. 4 shows a diagram to illustrate the profile of the phase angle between the mains voltage and the pole-wheel voltage of the motor at a rotation speed close to the synchronous rotation speed, FIG. 5 shows a diagram as in FIG. 3 in order to explain the process for identification of a rotation speed which is sufficiently high for synchronization, for the transition to synchronization, FIG. 6 shows a flowchart in order to explain an algorithm for identification of a rotation speed which in sufficiently high for synchronization, FIG. 7 shows a corresponding flowchart relating to an algorithm for identification of the optimum time for renewed actuation of the stator winding after a passive phase for synchronization of the motor, FIG. 8 shows a phase-angle diagram in order to explain further the processes for identification of the optimum time for synchronization, FIGS. 9a, 9b and 9c show basic diagrams relating to a change in the actuation (triggering strategy) after identification of the time which is optimum for synchronization, FIG. 10 shows a diagram with an example of an illustration of a winding current profile once synchronism has occurred, and FIG. 11 shows a further phase-angle diagram in order to explain the identification of the optimum time for carrying out a preferred flux reduction.

FIG. 1 shows, first of all, the construction of an external-rotor synchronous motor 1 according to the invention, and of an electronic starting apparatus 2. The synchronous motor 1 comprises an inner stator 4 and a permanent-magnet external rotor 6 (only part of which is illustrated) which rotates around it. The substantially cylindrical, pot-shaped or bell-shaped external rotor 6 is permanently magnetized around the circumference, so that magnetic north and south poles N, S are formed alternately in the rotation direction.

The electronic starting apparatus 2 actuates the stator 4 in order to start the external rotor 6 in such a manner that the external rotor 6 is accelerated in an exactly controlled manner to its synchronous rotation speed, and then continues to run in the mains-commutated synchronous mode. For this purpose, the stator 4 preferably has a stator winding 8 in such a manner that the magnetic flux can be varied at least between two values, to be precise a higher flux for starting and a lower flux for synchronous operation. In the illustrated example, the stator winding 8 for this purpose has a tap 8a, in which case only a portion of the stator winding 8 can be actuated via a first switching element 10 and the tap 8a for the higher flux, or the entire stator winding 8 can be actuated via a second switching element 12 for the lower flux. Further details of the background to this measure will be explained in more detail further below.

The switching elements 10, 12 associated with the starting apparatus 2 are each in the form of solid-state switches, such as thyristors or triacs, and they can be actuated by control signals S10, S12 from a control unit 14 in order to connect the motor 1 or the stator winding 8 to an AC voltage source 16, normally to the conventional mains voltage (L and N lines) of 230 V, 50 Hz.

The control unit 14 may comprise, for example, a microprocessor, microcontroller, application-specific integrated circuit (ASIC) or a programmable logic device (PLD).

The following sensors are preferably also provided for monitoring the control-relevant variables:

A rotor sensor 18 which is arranged in the vicinity of the external rotor 6 and is intended to produce a magnetic polarity signal S18 which changes alternately during rotation of the external rotor 6 and, depending on the rotation direction, runs either in phase or in antiphase with the pole-wheel voltage induced in the stator winding by the permanent-magnet rotor. Where the following text refers to the polarity of the pole-wheel voltage, then this refers to the output signal S18 from the rotor sensor, since the pole-wheel voltage is not detected directly.

A voltage sensor 20 which monitors the polarity of the AC operating voltage U and produces a correspondingly alternating voltage polarity signal S20.

According to the invention, the control unit 14 is designed in such a manner that the starting of the external rotor 6 from rest to synchronism is subdivided into a number of phases, in each of which the stator winding 8 is actuated in a different manner, matched in an optimized manner to the respective rotation speed. In detail, the phases according to the invention are as follows:

A starting phase I for starting the external rotor 6 from rest 6 in the desired rotation direction up to the first transitional rotation speed, an acceleration phase II for accelerating the external rotor 6 to a second transitional rotation speed, which is close to the synchronous rotation speed, a synchronization phase III—which is particularly important according to the invention—for transition of the rotor rotation speed in a controlled manner to the synchronous rotation speed, that is to say up to the synchronous mode IV which follows this.

The technical background and the measures according to the invention will now be explained in more detail.

Since solid-state switches (thyristors or triacs) only switch current on but cannot switch it off, the control system can no longer influence the current once the switch has been triggered. The current will produce an accelerating or braking torque depending on the polarity of the mains voltage and the pole-wheel voltage (that is to say the voltage induced by the rotor). The polarity of the pole-wheel voltage is detected by the rotor sensor 18 from the magnetic field of the rotor. Alternatively, the rotor position can also be detected via optical encoders. The control system can thus produce an accelerating torque in the motor only at limited times, as a function of the instantaneous phase angle of the pole-wheel voltage (rotor position) of the motor and the mains voltage.

The duration of the time phases in which the motor cannot produce any accelerating torque because the pole-wheel voltage and the mains voltage are then running in antiphase, that is to say in which the winding current produced after triggering of the switch would have the opposite polarity to the pole-wheel voltage, increases with the rotation speed. The duration of the time phases in which acceleration is possible likewise increases. The closer the motor rotation speed becomes to the synchronous rotation speed, the longer these time periods become. In this rotation speed range, the motor produces bad vibration and noise. If the motor had a low moment of inertia, as in the case of internal rotors, it could pass through this critical rotation speed range relatively easily.

However, the acceleration process, for example in the case of fans, in which the load torque increases with the square of the rotation speed, can be carried out only by increasing the flux in order that the torque required at the synchronous rotation speed is reached on average despite the phases in which no acceleration can be produced. This can be achieved by connecting the mains voltage to the tap 8a of the stator winding 8, which means greater motor currents, greater flux and thus increased torques as well. However, in this case, it is necessary to remember that the increased motor torques mean a greater risk of demagnetizing the rotor magnet, so that the capability to increase the torque significantly is limited by the magnet material.

In the configuration as an external-rotor motor according to the invention, the synchronous motor has a considerably higher moment of inertia. It therefore requires considerably more energy for starting and acceleration. In this case, difficulties can arise during synchronization. This means that the external-rotor synchronous motor can admittedly reach rotation speeds close to the synchronous rotation speed with relatively few problems, but, if possible at all, it could not directly make the transition to synchronism. It is therefore advantageous to deal in particular with the synchronization phase III in more detail from the control point of view. However, prior to this, the preceding operating phases will be explained in more detail as well.

1. Starting Phase I

In this phase, the motor is generally started from rest in the desired rotation direction. However, starting is particularly critical if the motor is already rotating in the opposite direction to that desired on starting, for example if it is being driven by an external torque (example: reverse pressure in the case of fans).

Once the switching element had been initially triggered, an internal-rotor motor would quickly reach a specific rotation speed. However, on the other hand, owing to the greater mass moment of inertia, an external-rotor motor can be accelerated only slowly. It is therefore worthwhile introducing a separate starting phase for the external-rotor synchronous motor. In this case, according to the invention, a check is carried out to determine whether the time period between two polarity changes of the magnetic polarity signal S18 can be detected reliably. If this is not possible, the switching element 10 is actuated via an adapted control method without any time information. For this purpose, the control system evaluates only the polarity of the mains voltage, the polarity of the pole-wheel voltage and the magnetic polarity signal without in this case taking any account of their time profile. A control method based on combinational logic is thus used in this operating phase. The stator winding 8 is in this case connected to the mains voltage only when its polarity is the same as that of the pole-wheel voltage.

FIG. 2 shows, by way of example, such a combinational logic process for actuation of the switching element 10 via the control system S10 for one specific rotation direction, as is used during the starting phase. In this case, the magnetic polarity signal S18 and the voltage polarity signal S20 are processed in the described manner via logic gates to form the control signal S10. An input signal SE is in this case used for activating the starting phase. The starting or acceleration in the desired rotation direction is defined uniquely by the combinational logic. The described exemplary embodiment (FIG. 2) relates to one specific rotation direction of the motor. For example, for counterclockwise running, the switch 10 is triggered when S18 and S20 are at the same logic level, while S18 and S10 must be at different logic levels for the motor to run clockwise. In the latter case, the signal from the rotor sensor 18 is inverted.

The time measurement, which has already been referred to above, between two polarity changes of the magnetic polarity signal S18, that is to say of the pole-wheel voltage, which is used as a criterion for the transition from the starting phase to the acceleration phase, can advantageously be carried out using a digital counter which is incremented cyclically at a fixed frequency. When a polarity change occurs, the control unit 14 reads the count for further processing, and the count is at the same time reset for a new time measurement. A specific maximum time period, which depends on the final value and the clock frequency of the counter, can be detected before the counter overflows. The described control method for starting thus remains active until the time period to be measured is short enough, that is to say the rotation speed is sufficiently high, that the counter no longer overflows, that is to say the count which is read when a polarity change occurs reliably reflects the time period between two polarity changes of the pole-wheel voltage, in which case it is possible to define the present rotor position (rotation angle).

The starting phase is terminated when the motor has reached a rotation speed which makes it possible for the control system to reliably operate using the method intended for the acceleration phase. In the example with a four-pole motor, this occurs at a rotation speed of approximately 300 rpm, that is to say at approximately 20% of its synchronous rotation speed when being operated from a 50 Hz mains system.

2. Acceleration Phase II

The aim of the acceleration phase is to bring the motor to a speed close to the synchronous rotation speed. To do this, it is necessary to produce an accelerating torque which is as great as possible on average and acts in the desired rotation direction, but without demagnetizing the permanent-magnet rotor in the process.

Owing to the lower acceleration values which are typical of the external rotor, there is advantageously no need to determine the rotor position absolutely by evaluation using, for example, analog Hall sensors. Instead of this, as already mentioned, the present rotor position can advantageously be calculated with good accuracy on the basis of the previous times between two successive polarity changes of the pole-wheel voltage or of the magnetic polarity signal S18, and on the basis of the time which has passed since the last polarity change. This method has the major advantage that there is no need to evaluate analog signals which are related to the rotor position, and this leads to a more cost-effective solution.

The control measure during the acceleration phase is as follows:

A predicted assessment of the phase angle between the mains voltage (signal S20) and the pole-wheel voltage or rotor position (signal S18) is carried out in order to determine whether, if the switch S10 is triggered at that time, this will result in a maximum accelerating effect in the rotation direction. This is done by definition of regions related to the rotor position, that is to say to the signal S18, in which the positive or negative half-cycles or half-cycle parts of the mains voltage are selectively connected to the winding, as is shown in FIG. 9.

The acceleration phase is completed when the control system identifies that the rotor has virtually reached the synchronous rotation speed. In the example of a four-pole motor, this occurs at a rotation speed of approximately 1350 rpm, that is to say at approximately 90% of its synchronous rotation speed, when the motor is being operated on a 50 Hz mains system.

An internal-rotor motor with a short mechanical time constant would now automatically be raised to synchronism during an acceleration phase, provided the rotation speed is close enough to the synchronous rotation speed. Owing to the fact that the mass moment of inertia of the external rotor is greater than that of an internal rotor, particularly in conjunction with a fan impeller, the slowly changing phase angle between the mains voltage and the pole-wheel voltage in the vicinity of the synchronous rotation speed may, however, lead to a pronounced, low-frequency fluctuation of the motor current and of the torque, which can make synchronization more difficult. It is thus advantageous to introduce an additional operating phase, the synchronization phase according to the invention.

3. Synchronization Phase III

According to the invention, this phase can be subdivided more finely:

III.1. Identification of the time which is suitable for synchronization, governed by the phase angle between the pole-wheel voltage (or rotor position) and the mains voltage, III.2. Stabilization phase, in which equalization processes decay (in one particularly advantageous version of the invention, actively supported by the control unit 14 by suitable adaptation of the winding voltage), III.3. Identification of the best time for flux matching, preferably by switching the stator winding 8.

The synchronization phase is ended when the dynamic processes after flux matching have been completed and the motor is running synchronously with the frequency of the mains voltage and with a constant phase angle between the mains voltage and the pole-wheel voltage.

III.1. Identification of the Suitable Synchronization Time

The longer mechanical time constant (greater moment of inertia) of the external-rotor motor, in particular when used for driving a fan impeller, leads to a pronounced, low-frequency fluctuation in the amplitude of the winding current, and thus in the torque, during acceleration at rotation speeds in the vicinity of the synchronous rotation speed. This is a result of the phase angle between the mains voltage and the pole-wheel voltage varying to an ever slower extent the closer the rotation speed comes to the synchronous rotation speed. This results in the time phases in which no acceleration is possible (because the mains voltage and the pole-wheel voltage are in antiphase) becoming ever longer. An exacerbating factor in these phases is that the rotation speed of the motor is reduced by the mechanical load.

By way of example, FIG. 3 shows the winding current profile of an external-rotor synchronous motor, and FIG. 4 shows the phase angle of the mains voltage with respect to the pole-wheel voltage plotted against time at rotation speeds in the range from 85 to 90% of the synchronous rotation speed. In this case, the mains voltage half-cycles are plotted on the abscissa against the number n. The switch 10 is triggered, for example, in the positive part of the diagram shown in FIG. 4, which corresponds to the accelerating phase, and the switch is not actuated in the negative part of the diagram.

In an external rotor, the time after a current flow pause at which the process of connecting the winding to the mains starts once again governs reliable synchronization of the motor to the mains voltage. According to the invention, renewed connection of the winding after the current-flow pause takes place when the pole-wheel voltage with respect to the mains voltage has assumed a phase angle such that the winding current resulting from switching on the switching element (taking account of any possible demagnetization of the permanent-magnet rotor) produces a maximum accelerating effect on average. This is the case when the mains voltage is running approximately in phase with the pole-wheel voltage, or is slightly leading it.

To achieve this, a check is first of all carried out to determine whether the rotation speed is in the vicinity of the synchronous rotation speed. This can advantageously be done by evaluating the frequency at which the regions of continuous current flow and the regions without any current flow alternate. This "fluctuation frequency" is the difference between the electrical rotation frequency of the rotor and the mains frequency.

According to the invention, the number of subsequently switched on current half-cycles or partial regions of the mains voltage and the number of half-cycles of the mains voltage which are subsequently not used for current flow are used as the criterion for the existence of synchronization (rotation frequency≈frequency of the mains voltage). Owing to the relatively high mass moment of inertia of the external rotor, these fluctuation effects are pronounced, and this is specifically used according to the invention.

By way of example, FIG. 5 shows such a situation for identification of a rotation speed which is sufficiently high for synchronization. During the active, accelerating time phase, the mains voltage half-cycles, or phase-gated half-cycle parts, which are subsequently connected to the stator winding are detected using a counter Z. The switching element 10 is not actuated during one mains half-cycle, that is to say the winding 8 is not connected to the mains voltage, then Z is reset. The count, that is to say the number of half-cycles (parts) switched on subsequently, is continuously compared with a preset limit value $Z_s$. When Z reaches the comparison value $Z_s$ this means that a rotation speed which is sufficiently high for synchronization has been reached, and synchronization is imminent. The comparison value $Z_s$ is motor-specific and depends on the mechanical time constant of the system.

By way of example, FIG. 6 shows the identification process in the form of a flowchart. If the criteria shown in the flowchart are satisfied, that is to say if the switch 10 has subsequently been actuated during $Z_s$ mains half-cycles, then the synchronous rotation speed has been virtually reached and synchronization is shortly imminent (a $Z_s$ of, for example, 20 corresponds to a rotation speed of 95% of the synchronous rotation speed).

In the same way, the number of half-cycles (parts) which are not subsequently switched on can, of course, also be used as the criterion.

The optimum time for renewed connection of the winding to the mains voltage after the passive time phase is identified exactly using the phase angle of the mains voltage and pole-wheel voltage.

To this end, the phase shift $\phi$ between the voltage polarity signal S20 of the mains voltage and the magnetic polarity signal S18 (corresponding to the pole-wheel voltage) is detected by the control unit 14 and is compared with a predetermined threshold $\phi_s$. Renewed actuation of the winding after the passive time phase takes place once the phase shift has reached or passed through the threshold, according to the invention when the mains voltage is slightly leading the pole-wheel voltage, that is to say, on average, the appropriate winding current i after triggering reaches a maximum accelerating effect (runs in phase with the pole-wheel voltage). The value $\phi_s$ is motor-specific and depends mainly on the electrical time constant of the stator winding 8.

FIG. 7 illustrates the control sequence to identify the time of renewed triggering of the switching element 10 after the passive phase, in the form of a flowchart. The phase angle between the signals S20 and S18 is determined continuously by the control unit 14, for example in the form of a time measurement between the level change of the signal S20, corresponding to the zero crossing of the mains voltage, and the level change of the signal S18, corresponding to the zero crossing of the pole-wheel voltage. Once a predetermined phase angle limit has been reached or exceeded, then the renewed actuation of the switch 10 takes place in accordance with a triggering strategy matched to the synchronization, in the manner described further below and as shown in FIGS. 9a–9c.

FIG. 8 shows the time profile of the phase angle between the mains voltage and the pole-wheel voltage shortly before and during synchronization. This illustrates the process described in FIG. 7, in which the winding current and the phase angle are plotted, by way of example, against the time. At the time at which the condition $Z \geq Zs$ is satisfied, synchronization is shortly imminent. The renewed actuation using the adapted triggering strategy takes place at the time $\phi \geq \phi_s$.

Since the synchronization always take place at synchronous rotation speed, the time shift between the mains voltage and the pole-wheel voltage $\Delta t = \phi/\omega$ or $\Delta t_s = \phi_s/\omega$ where $\omega = 2\pi f$ = constant can more advantageously be used instead of the phase shift angles $\phi$ and $\phi_s$, in practice.

111.2. Stabilization Phase

After identification of the suitable time for synchronization, that is to say for renewed actuation of the stator winding after the passive range at a sufficiently high rotation speed, the triggering strategy for the switching element is changed. During the acceleration phase, triggering was deliberately suppressed shortly before the polarity change of the pole-wheel voltage, that is to say of the magnetic polarity signal S18, in order to produce as large an accelerating torque as possible on average.

During and after the synchronization phase, on the other hand, this restriction is partially cancelled, that is to say braking torques are also allowed at times, in order in this way to keep the motor synchronized.

In this changed triggering strategy, the phase angle between the mains voltage (signal S20) and the pole-wheel voltage or rotor position (signal S18) is determined and assessed as during acceleration of the motor. However, when running synchronously, the permissible phase angle range within which triggering of the switch 10 takes place via the signal S10 is greater, in order not exclusively to achieve maximum acceleration. The permissible phase angle range is defined over ranges which are related to the rotor position (pole-wheel voltage) and in which the positive or negative half-cycle or half-cycle parts of the main voltage is or are in each case connected to the winding (see FIGS. 9a–9c).

If, for example, a control method which is known per se for an internal-rotor motor is applied to the acceleration of the external-rotor synchronous motor, in which time intervals which occur periodically and are related to the rotor position are defined in order to enable actuation of the switching element, this means that the period in which actuation is possible is extended, and the time period in which no actuation is allowed is reduced. By way of example, FIGS. 9a–9c show the adaptation of the time periods as must be carried out after identification of the optimum point in time after the passive phase for synchronization of the external-rotor synchronous motor. FIG. 9a shows the pole-wheel voltage and the magnetic polarity signal S18. FIG. 9b shows the time periods for selective actuation of the switching element during acceleration, with triggering at b1 for a negative mains voltage and triggering at b2 for a positive mains voltage. FIG. 9c shows the corresponding time periods when running synchronously. The extension of the time periods within which triggering of the switching element is allowed, as shown in FIGS. 9a–9c, permits winding currents which continue beyond the polarity change and which thus produce a braking torque effect after this polarity change. The further the mains voltage lags the pole-wheel voltage, the greater is the time period of there braking torques. The mean torque is thus reduced. In the opposite situation, the time period of the braking torques is reduced, as a result of which the mean torque rises. Due to braking of the rotor, an increase in the mechanical load results in a phase shift toward a leading mains voltage, as a result of which the mean torque rises and counteracts any desynchronization tendency. On the other hand, reduction in the mechanical load on the motor results in acceleration of the rotor and, in consequence, the phase angle changing toward a lagging mains voltage, as a result of which the mean torque falls, and thus counteracts any further acceleration.

Increasing acceleration of the motor (above the synchronous rotation speed) is thus counteracted by increasing the braking torques, and vice versa. The motor is thus kept synchronized very well. However, an oscillating system is formed whose damping is generally governed only by the steady-state load torque.

During the transition from motor asynchronous running to synchronous running, a periodic fluctuation of the phase angle thus occurs between the variables mains voltage, winding current and pole-wheel voltage (transient process), which results in a likewise periodic change in the amplitude of the winding current and of the torque. This oscillation is damped to a greater or lesser extent by the load torque, and thus decays with time.

As an example, FIG. 10 shows such a winding current profile, which is typical of an external-rotor motor, in the situation shortly after the start of synchronism. This oscillation, which is caused by the long mechanical time constant of the external rotor and whose frequency is low in comparison with the mains frequency, allows active damping after synchronization to be carried out by suitably changing the root mean square value of the winding voltage, for example by phase-gating the mains voltage. In this case, the root mean square winding voltage is changed according to the invention such that the current flow, and in consequence the torque which is formed, are influenced in such a way that the tendency to oscillate is reduced, and the phase angle between the mains voltage and the pole-wheel voltage is kept at a predetermined reference value by means of the signal S18 from the rotor sensor.

According to the invention, the reference value is defined such that it corresponds to the phase angle between the mains voltage and the pole-wheel voltage which is expected after flux matching.

Any acceleration above the synchronous rotation speed, that is to say a change in the phase angle toward a leading pole-wheel voltage, is counteracted by low root mean square winding voltages (=reduced accelerating torque). Braking below the synchronous rotation speed, which is equivalent to the phase angle changing toward a leading mains voltage, is once again countered by high root mean square winding voltages (=high accelerating torque).

This active damping is carried out, for example, via a digital PID phase locked loop by the control unit 14, which compares the phase angle between the mains voltage and the pole-wheel voltage (controlled variable) and influences this via the triggering delay time of the phase-gating controller (manipulated variable) in such a manner that the error from the predetermined reference value (reference variable) tends to zero.

The winding voltage is provided as in the case of the methods known from the prior art by, for example, phase-gating control or by switching off individual mains half-cycles.

This preferred method allows the transient during the transition to synchronous running to be reduced and, in consequence, allows the disturbing audible noise which is normally produced in the process to be decreased. Use of this active damping of the oscillation tendency is not just limited to the operational situation of synchronization but can also advantageously be used during steady-state synchronous operation in order to stabilize the operating behavior while synchronized.

It should be noted that the described method cannot generally be used with an internal-rotor synchronous motor since, owing to its considerably shorter mechanical time constant, the oscillation takes place at a higher frequency than with an external rotor and, in consequence, influencing the winding voltage at twice the mains frequency, as is the case with phase gating, is not sufficient.

III.3. Flux Matching

During operating phases I. Starting, II. Acceleration and III. Synchronization, the synchronous motor requires more flux than that which is provided for maximum efficiency during synchronous operation. In one preferred embodiment—as already described—the stator winding 8 is split into two parts, which can each be supplied with current individually by means of the respective associated switching elements 10 or 12 (see FIG. 1).

With external-rotor synchronous motors, the time at which the winding switching is carried out in order to reduce the flux during synchronous operation is critical for locking into synchronism. If the flux reduction is not carried out at a good time, then the motor can become desynchronized again. Surprisingly, tests have shown that the flux reduction can virtually complete end the motor transient, provided it is carried out at a good time.

The winding switching, that is to say the actuation of the switching element 12 for a large number of turns instead of the switching element 10 for a small number of turns, is carried out, according to the invention, at the zero crossing of the winding current. Identification of the optimum time for winding switching is dependent on whether the active damping described above is or is not implemented.

With active damping, the stabilization phase is regarded as being complete when the fluctuation in the phase angle of the electrical variables is reduced to sufficiently low values by the active damping, and synchronous operation of the motor is thus not endangered by flux matching. Either the phase angle of the signals used for the phase locked loop described above (phase angle of the mains voltage with respect to the pole-wheel voltage) or the output signal from the regulator (gating angle for the mains voltage) is used for this purpose. When the condition of sufficiently small time fluctuation is satisfied, the switching of a reduced flux takes place, that is to say the actuation of the switching element 12 for a large number of turns, at the next zero crossing of the winding current.

If on the other hand, active damping is not used, then the steady-state load produces only relatively little damping. The motor runs at the synchronous rotation speed, on average, but its instantaneous rotation speed fluctuates about the synchronous point at the oscillation frequency of the system. Oscillation phases during which the mains voltage leads the pole-wheel voltage result in acceleration, while, in contrast, phases in which the pole-wheel voltage leads the mains voltage have a braking effect. If the rotation speed is greater than the synchronous rotation speed, then the phase angle changes toward a leading pole-wheel voltage, which leads to a braking oscillation phase in which the rotation speed decreases. If, on the other hand, the rotation speed is less than the synchronous rotation speed, then the phase angle changes toward a leading mains voltage, which results in an accelerating oscillation phase, in which the rotation speed rises once again.

The advantageous time for flux matching in order to increase efficiency occurs, according to the invention, where the error between the instantaneous rotation speed and the synchronous rotation speed changes from the negative (subsynchronous) region to the positive (oversynchronous) region. This corresponds to the time at which the rate of change of the phase angle between the mains voltage and the pole-wheel voltage is zero, and the acceleration is a maximum. The reduction in the flux which takes place here, in which the switch 12 rather than the switch 10 is actuated at the next zero crossing of the winding current, avoids repeated excessive acceleration above the synchronous rotation speed, thus reducing the system oscillation and avoiding desynchronization of the motor.

In the exemplary embodiment, the rate of change of the phase angle between the mains voltage and the pole-wheel voltage is determined by the control unit 14 by measuring the time between the zero crossing of the mains voltage (signal S20) and the zero crossing of the pole-wheel voltage (signal S18). The advantageous time coincides with the time of the maximum phase angle between the mains voltage and the pole-wheel voltage, which is determined by the control unit 14 using a numerical method for extreme-value determination, which is known from the prior art.

By way of example, FIG. 11 shows the time profile of the phase angle and, at 24, the best time or time frame for flux reduction.

The error between the rotation speed and the synchronous rotation speed can also, of course, be used to identify the advantageous time for flux reduction. This is done by forming the difference in the time period between two zero crossings of the pole-wheel voltage using the rotor sensor signal S18 and the time period between the zero crossings of the mains voltage using the mains-voltage polarity signal S20, and is carried out by the control unit 14. The times are inversely proportional to the rotation frequency of the motor and to the mains frequency, respectively, thus making it possible to use this method to determine the time. The time for flux matching occurs when the difference mentioned above changes from the positive (subsynchronous) region to the negative (oversynchronous) region.

The time at which the flux reduction is carried out has a critical influence on the motor behavior for an external-rotor synchronous motor (in contrast to the situation with an internal-rotor version). If the flux matching is carried out using the method described above, this results in reliable locking at synchronism, that is to say it avoids desynchronism. As a further major advantage, the transient response which actually generally occurs is reduced to a minimum after matching, which has a positive influence on the noise behavior.

The invention is not restricted to the exemplary embodiments illustrated and described, but also covers all embodiments with the same effect in the sense of the invention. Furthermore, the invention is also so far not yet restricted to the feature combination defined in claim 1, but can also be defined by any given other combination of specific features of all the individual features disclosed overall. This means that, in principle, virtually any individual feature of claim 1 can be omitted, or can be replaced by at least one individual feature disclosed at some other point in the application. To this extent, claim 1 should be regarded as being only an initial formulation attempt for an invention.

What is claimed is:

1. A mains-commutated, synchronous AC motor (1) with permanent-magnet excitation, comprising:
   an external-rotor motor with a permanent-magnet external rotor (6) which rotates around an inner stator (4);
   wherein the stator (4) has a stator winding (8) selectably operated to vary the magnetic flux between a higher flux for starting and a lower flux for synchronous operation;
   wherein the stator winding (8) has a tap (8a) operative to activate only a portion of the stator winding (8) via a first switching element (10) and the tap (8a) for the higher flux, and wherein the entire stator winding (8) is actuated via a second switching element (12) for the lower flux; and
   wherein the switching elements (10, 12) each comprise solid-state switches, and are actuated by control signals (S10, S12) from a control unit (14).

2. The synchronous motor as claimed in claim 1, further comprising an electronic starting apparatus (2) operative to actuate the stator (4) in order to start the external rotor (6) in such a manner that the external rotor (6) is accelerated in a controlled manner to its synchronous rotation speed, and then continues to run in the mains-commutated synchronous mode (IV).

3. The synchronous motor as claimed in claim 1, wherein an axial or radial fan wheel is mounted on the external rotor (6).

4. The synchronous motor as claimed in claim 1, further comprising a rotor sensor (18), operatively associated with the external rotor (6) for producing a magnetic polarity signal (S18) which changes alternately during rotation of the external rotor (6).

5. The synchronous motor as claimed in claim 1, further comprising a voltage sensor (20) which produces a voltage polarity signal (S20) which monitors and appropriately alternates the polarity of the AC operating voltage (U).

6. The synchronous motor as claimed in claim 1, wherein the control unit subdivides the starting of the external rotor (6) into a number of phases (I, II, III, IV), in each of which the stator winding (8) is actuated in a different manner, matched to the respective rotation speed.

7. The synchronous motor as claimed in claim 6, wherein the controlled unit is operative to provide a starting phase (I) for starting the external rotor (6) in a desired rotation direction up to a first transitional rotation speed.

8. The synchronous motor as claimed in claim 7, wherein the control unit is operative, in the starting phase (I), to activate the stator winding (8) via the tap (8a) only when the mains voltage and the pole-wheel voltage have the same polarity.

9. The synchronous motor as claimed in claim 6, wherein the control unit is operative to provide an acceleration phase (II) for accelerating the external rotor (6) to a second transitional rotation speed, which is in the vicinity of the synchronous rotation speed.

10. The synchronous motor as claimed in claim 9, wherein, during the acceleration phase (II), the control unit determines the rotor position in response to the times between two respective successive polarity changes of the pole-wheel voltage or of the magnetic polarization signal (S18), and in response to the time which has passed since the preceding polarity change.

11. The synchronous motor as claimed in claim 9, wherein, during the acceleration phase, the control unit carries out a predicted assessment of the phase angle between the mains voltage (signal S20) and the pole-wheel voltage (signal S18) in order to determine whether switching on the respective switching element (10) may result in a maximum accelerating effect in that rotation direction, in response to defined regions related to the rotor position (signal S18), in which the positive or negative half-cycles or half-cycle parts are connected selectively to the stator winding (8).

12. The synchronous motor as claimed in claim 6, wherein the control unit is operative to provide a synchronization phase (III) for transition of the rotor rotation speed in a controlled manner to the synchronous rotation speed corresponding to the synchronous mode (IV).

13. The synchronous motor as claimed in claim 12, wherein the control unit is operative to subdivide the synchronization phase as follows:
   identification of a time (III.1) which is suitable for synchronization, as a function of the phase angle ($\phi$) between the pole-wheel voltage and the operating voltage (U),
   a stabilization phase (III.2), and
   flux matching (III.3) by switching the stator winding (8) to a reduced flux.

14. The synchronous motor as claimed in claim 13, wherein once the time which is suitable for synchronization has been identified, the control unit is operative to change the actuation of the switching element (10) in such a manner that, in addition to the accelerating torque, braking torques are also allowed at times in order to stabilize the motor at the synchronous rotation speed.

15. The synchronous motor as claimed in claim 13 wherein the control unit is operative to carry out the flux matching by actuating the second switching element (12) instead of the first switching element (10) when the difference between the instantaneous rotation speed and the synchronous rotation speed changes from the negative, subsynchronous region to the positive, oversynchronous region.

* * * * *